(12) United States Patent
Nozue et al.

(10) Patent No.: US 10,931,887 B2
(45) Date of Patent: Feb. 23, 2021

(54) COLLATION DEVICE

(71) Applicant: PANASONIC INTELLECTUAL PROPERTY MANAGEMENT CO., LTD., Osaka (JP)

(72) Inventors: Yosuke Nozue, Kanagawa (JP); Kazuki Maeno, Kanagawa (JP); Hiroaki Yoshio, Kanagawa (JP); Masao Kubota, Tokyo (JP); Yoshinori Kunieda, Tokyo (JP); Hiroyuki Matsumoto, Tokyo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 73 days.

(21) Appl. No.: 16/084,837

(22) PCT Filed: Feb. 15, 2017

(86) PCT No.: PCT/JP2017/005485
§ 371 (c)(1),
(2) Date: Sep. 13, 2018

(87) PCT Pub. No.: WO2017/159185
PCT Pub. Date: Sep. 21, 2017

(65) Prior Publication Data
US 2020/0169670 A1 May 28, 2020

(30) Foreign Application Priority Data

Mar. 17, 2016 (JP) .............................. JP2016-054080

(51) Int. Cl.
*H04N 5/247* (2006.01)
*G02B 27/14* (2006.01)
(Continued)

(52) U.S. Cl.
CPC ........... *H04N 5/247* (2013.01); *G02B 27/144* (2013.01); *G02B 27/286* (2013.01);
(Continued)

(58) Field of Classification Search
CPC .... H04N 5/247; H04N 5/2257; H04N 5/2254; G02B 27/286; G02B 27/144;
(Continued)

(56) References Cited

U.S. PATENT DOCUMENTS 9,047,505 B2 6/2015 Yoshio
2002/0181034 A1* 12/2002 Miyake ................ H04N 5/2254
358/514
(Continued)

FOREIGN PATENT DOCUMENTS

EP 2773090 A1 9/2014
JP 5-035935 A 2/1993
(Continued)

OTHER PUBLICATIONS

International Search Report issued in International Bureau of WIPO Patent Application No. PCT/JP2017/005485, dated Apr. 11, 2017.
(Continued)

*Primary Examiner* — Lin Ye
*Assistant Examiner* — Chan T Nguyen
(74) *Attorney, Agent, or Firm* — Greenblum & Bernstein, P.L.C.

(57) ABSTRACT

There is provided a collation device capable of capturing a face image suitable for collation by an imaging device while making a display suitable for collation by a display to a person in the front side of a half mirror. By disposing a plurality of displays with predetermined gap in the back side of the half mirror and disposing camera lenses and in this gap, it is possible to make the line of sight for viewing the display and the line of sight for imaging by the cameras be
(Continued)

almost the same. As a result, it is possible to capture a face image suitable for collation by an imaging device while making a display suitable for collation by a display to a person in the front side of the half mirror.

15 Claims, 5 Drawing Sheets

(51) Int. Cl.
*G02B 27/28* (2006.01)
*G06F 3/14* (2006.01)
*H04N 5/225* (2006.01)

(52) U.S. Cl.
CPC ......... *G06F 3/1423* (2013.01); *H04N 5/2254* (2013.01); *H04N 5/2257* (2013.01)

(58) Field of Classification Search
CPC ........................ G06F 3/1423; G06K 19/025; G06K 9/00201; G06K 9/00208; G07C 9/10; G07C 9/20; G07C 9/22; G07C 9/25; G07C 9/253; G07C 9/257
USPC ........................................................ 348/262
See application file for complete search history.

(56) References Cited

U.S. PATENT DOCUMENTS

| | | | | |
|---|---|---|---|---|
| 2003/0086591 | A1* | 5/2003 | Simon | G07C 9/25 382/115 |
| 2004/0240711 | A1* | 12/2004 | Hamza | G06K 9/00288 382/118 |
| 2004/0252988 | A1* | 12/2004 | Imaoka | G06K 9/00604 396/18 |
| 2005/0252988 | A1* | 11/2005 | Chang | B05B 3/00 239/225.1 |
| 2006/0103627 | A1 | 5/2006 | Watanabe et al. | |
| 2007/0122011 | A1* | 5/2007 | Takizawa | G07C 9/37 382/118 |
| 2008/0225121 | A1* | 9/2008 | Yoshida | H04N 5/247 348/159 |
| 2010/0201604 | A1* | 8/2010 | Kee | G06F 1/1641 345/1.3 |
| 2011/0227697 | A1* | 9/2011 | Spencer | G06Q 10/06 340/5.6 |
| 2013/0229566 | A1 | 9/2013 | Kaifu | |
| 2014/0256423 | A1* | 9/2014 | Williams | G07F 17/3246 463/29 |
| 2014/0289270 | A1 | 9/2014 | Jafarifesharaki | |
| 2014/0362237 | A1* | 12/2014 | Tarres Bolos | H04N 1/00132 348/207.1 |
| 2015/0363154 | A1* | 12/2015 | Frederick | G06F 3/1423 345/1.3 |
| 2017/0116797 | A1* | 4/2017 | Whiteman | G07C 9/20 |

FOREIGN PATENT DOCUMENTS

| | | |
|---|---|---|
| JP | 10-134188 A | 5/1998 |
| JP | 2001-311993 A | 11/2001 |
| JP | 2002-303791 A | 10/2002 |
| JP | 2004-147105 A | 5/2004 |
| JP | 2005-135310 A | 5/2005 |
| JP | 2008-000464 A | 1/2008 |
| JP | 2009-181371 A | 8/2009 |
| JP | 2010-061063 A | 3/2010 |
| JP | 2010-061093 A | 3/2010 |
| JP | 2010-179012 A | 8/2010 |
| JP | 2013-190772 A | 9/2013 |
| JP | 2014-191223 A | 10/2014 |
| JP | 2015-225627 A1 | 12/2015 |
| WO | 1990/010251 A1 | 9/1990 |
| WO | 2008/066130 A1 | 6/2008 |

OTHER PUBLICATIONS

The Extended European Search Report dated Feb. 22, 2019 for the related European Patent Application No. 17766192.3.

* cited by examiner

COLLATION DEVICE

TECHNICAL FIELD

The present disclosure relates to a collation device including a display and a camera.

BACKGROUND ART

In the related art, a device in which a display and a camera are disposed on the back of a half mirror (hereinafter, such a device is abbreviated as "half-mirror display imaging device") has been proposed. In this half-mirror display imaging device, letters or images of the display may be seen from the front side of the half mirror by allowing the display in the back side of the half mirror to emit light. In addition, since an image substantially similar to a face and a figure reflected on the half mirror may be captured by the camera on the back side by using the half-mirror display imaging device, the captured image may be obtained while the user confirms his or her facial expression or the like.

PTL 1 discloses a health management system in which a display and a camera are disposed in the back side of a half mirror. In this health management system, a user in the front side of the half mirror may see the activity amount displayed on the half mirror by the display from the back side of the half mirror while watching the face and the figure of the person reflected on the half mirror, and it is possible to capture and record his or her own face and figure from the back side of the half mirror by the camera.

CITATION LIST

Patent Literature

PTL 1: Japanese Patent Unexamined Publication No. 2015-225627

SUMMARY OF THE INVENTION

As a half-mirror display imaging device as described above, a technique for imaging the face of a user while displaying information on a display and application to various scenes may be considered. For example, the technique may be applied to a collation device.

However, sufficient consideration has not been given to the configuration in the case of applying the technique of imaging the face of the user to the collation device while displaying the information on the display. In the related art, it may not be said that an imaging device may image a face image suitable for collation while making a display suitable for collation by a display to a user.

An embodiment of the present disclosure provides a collation device capable of imaging a face image suitable for collation by an imaging device while making a display suitable for collation by a display to a user.

The collation device according to one embodiment of the present disclosure is a collation device including a plurality of displays and an imaging device, in which the displays are disposed with a predetermined gap inside a housing of the collation device and the lens of the imaging device is disposed in the gap between the displays.

According to one aspect of the present disclosure, it is possible to capture a face image suitable for collation by an imaging device and to make a display suitable for collation by a display to a user.

Further advantages and effects in one aspect of the present disclosure will be apparent from description and drawings. Such advantages and/or effects are provided by several embodiments and features described in the specification and the drawings, respectively, but not all need to be provided to obtain one or more identical features.

DESCRIPTION OF EMBODIMENTS

Before describing the embodiments, the circumstances leading to one embodiment of the present disclosure will be described first.

The inventors of the present disclosure have paid attention to the following points when a device in which a display and a camera (imaging device) are disposed is applied to a collation device.

It is preferable that the display is disposed at or near the front position of the user so that the user may easily view an image. Likewise, it is preferable that the camera is also disposed at or near the front position of the user so that the user may capture the image facing the front.

However, when the display and the camera are disposed at the front position of the user, there is a disadvantage that a device (display or camera) disposed in front becomes a shielding object with respect to a device (camera or display) disposed behind. When the display is disposed in front of the user, because the camera is likely to be shielded by the display, it is difficult to obtain a proper front image for collation. On the other hand, when the camera is disposed in front of the user, because the display is likely to be shielded by the camera, it is difficult to display letters or images at places where the display is easy to see for the user. Furthermore, when the camera is disposed in front of the user, the image captured by the camera also becomes an image in which the user's line of sight deviates from the front (as the user may look at the display at a position far from the front). The inventors have conceived the idea of the configuration of the present disclosure based on the above-mentioned point of view.

Hereinafter, embodiments of the present disclosure will be described in detail with reference to drawings.

Configuration

Figure 1:
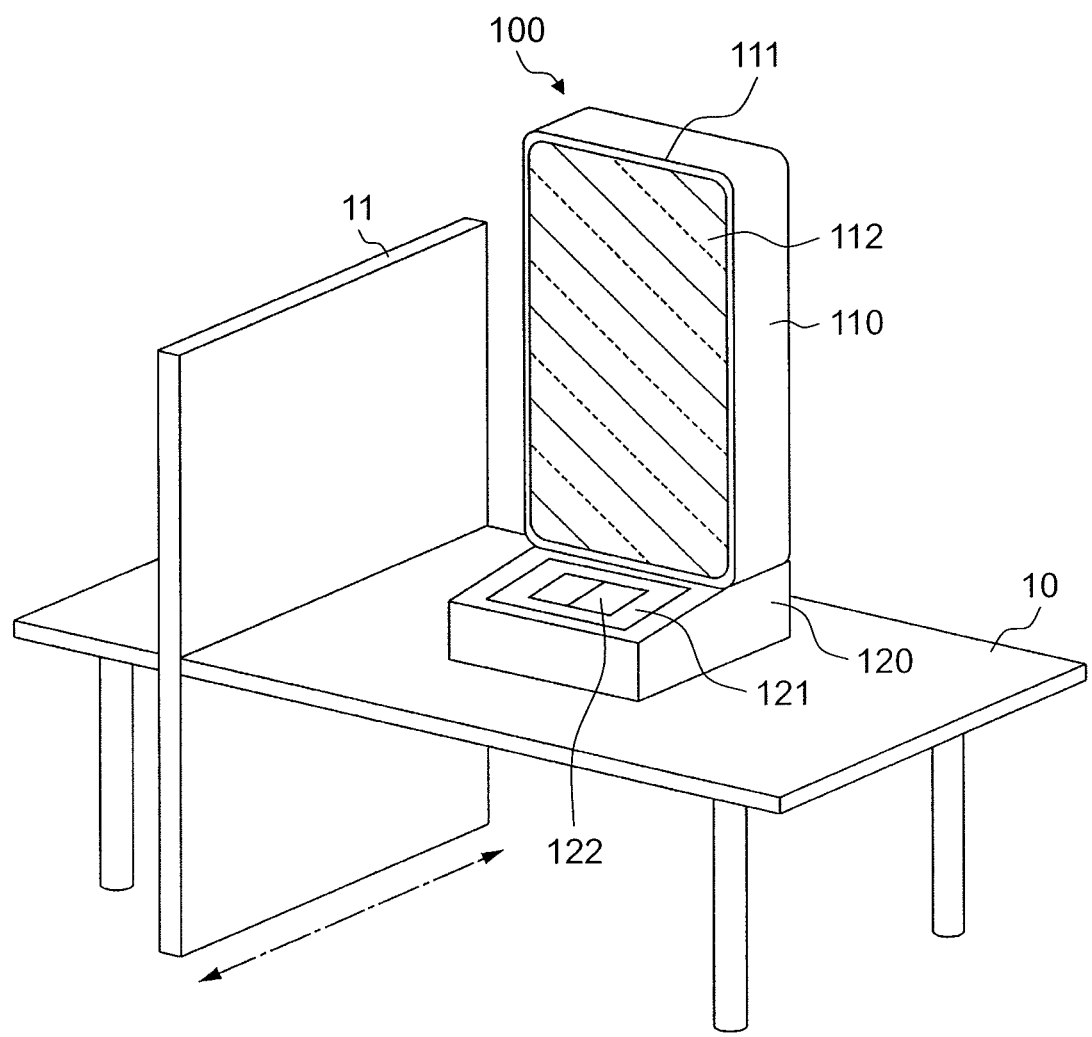
FIG. 1 is a view showing an external configuration of a collation device according to an embodiment.

FIG. 1 shows an appearance of collation device 100 according to an embodiment. FIG. 1 shows an example in which collation device 100 is applied to a gate device provided at an airport or the like.

Collation device 100 is placed on table 10. The gate device includes gate 11 that is movable to a position protruding from table 10 and a position retracted, as indicated by an arrow of a dashed line, and a driving device (not shown). The gate device drives gate 11 by a driving device. Collation device 100 and the gate device may communicate with each other. As a result of the collation by collation device 100, in a case where the user is authenticated, a predetermined signal is transmitted from collation device 100 to the driving device of the gate device. When receiving the predetermined signal, the driving device opens gate 11 by moving gate 11 to the position retracted from the table.

Collation device 100 includes main unit 110 and collation target image acquisition unit 120.

Main unit 110 includes housing 111 having a rectangular parallelepiped shape that is long in a vertical direction and half mirror 112 attached to the front side of housing 111. Inside housing 111, display 113 and camera lens 114, which will be described later, are accommodated.

Collation target image acquisition unit 120 reads passport 122 or the like placed on glass surface 121 with a scanner (not shown) or the like provided therein. In passport 122 and the like, a face image as a collation target image is recorded. In this way, collation target image acquisition unit 120 acquires a collation target image.

Figure 2:
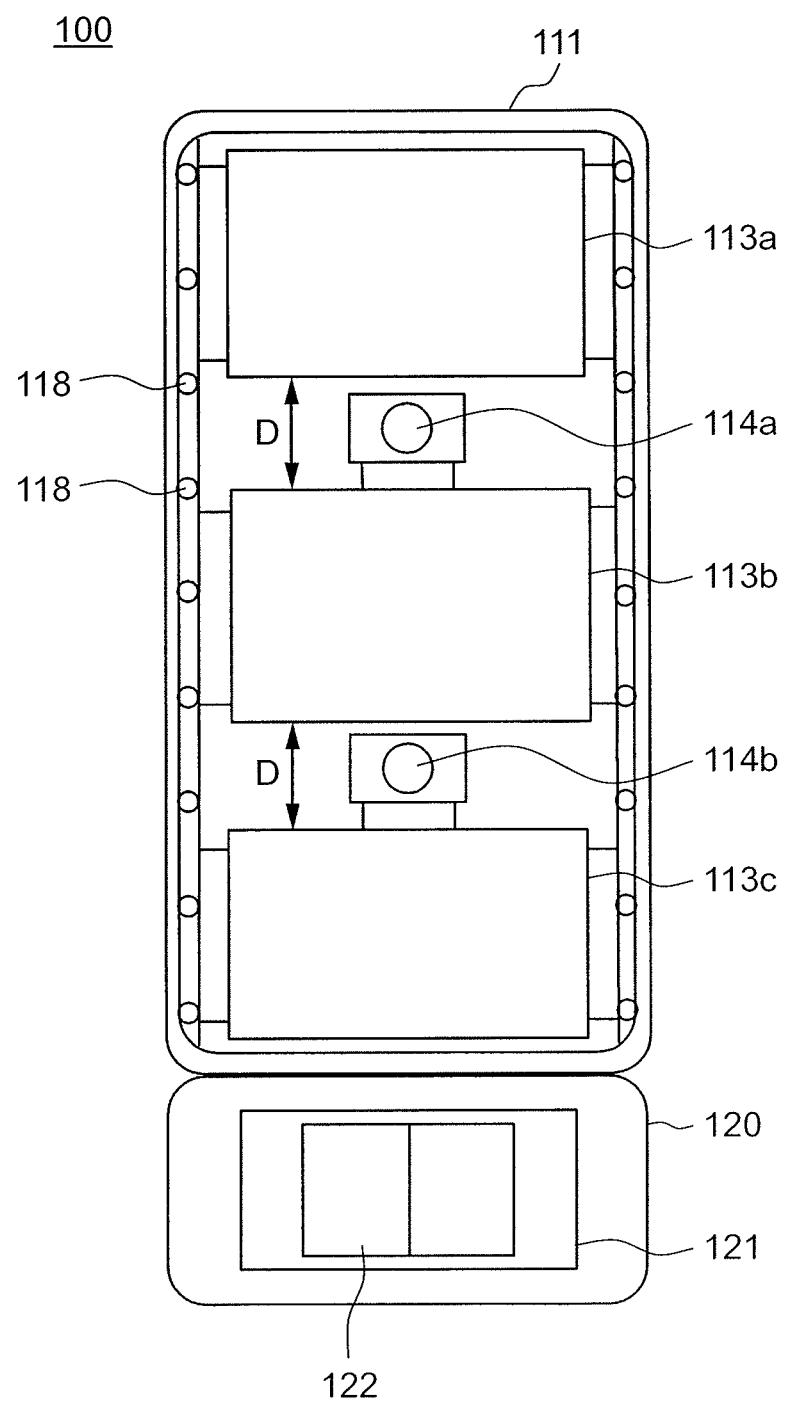
FIG. 2 is a front view showing an internal configuration of the collation device.

FIG. 2 is a front view showing an internal configuration of collation device 100. FIG. 2 is a view of the inside of housing 111 as seen from the front direction with half mirror 112 (FIG. 1) removed from housing 111.

In housing 111, a plurality of displays 113a, 113b, and 113c are disposed with predetermined gap D. In addition, camera lenses 114a and 114b are disposed in gaps D between displays 113a, 113b, and 113c. In the present embodiment, three displays 113a, 113b, and 113c are disposed side by side with gap D in the vertical direction, and two camera lenses 114a and 114b are disposed in different gaps D in the vertical direction.

Light emitting diode (LED) lamp 118 is provided on the front frame of housing 111. With this LED lamp 118, light may be irradiated to a person (user) in the front side of collation device 100. In the present embodiment, LED lamp 118 is disposed at a position covered with half mirror 112. LED lamp 118 may be also disposed at a position not covered by half mirror 112.

Figure 3:
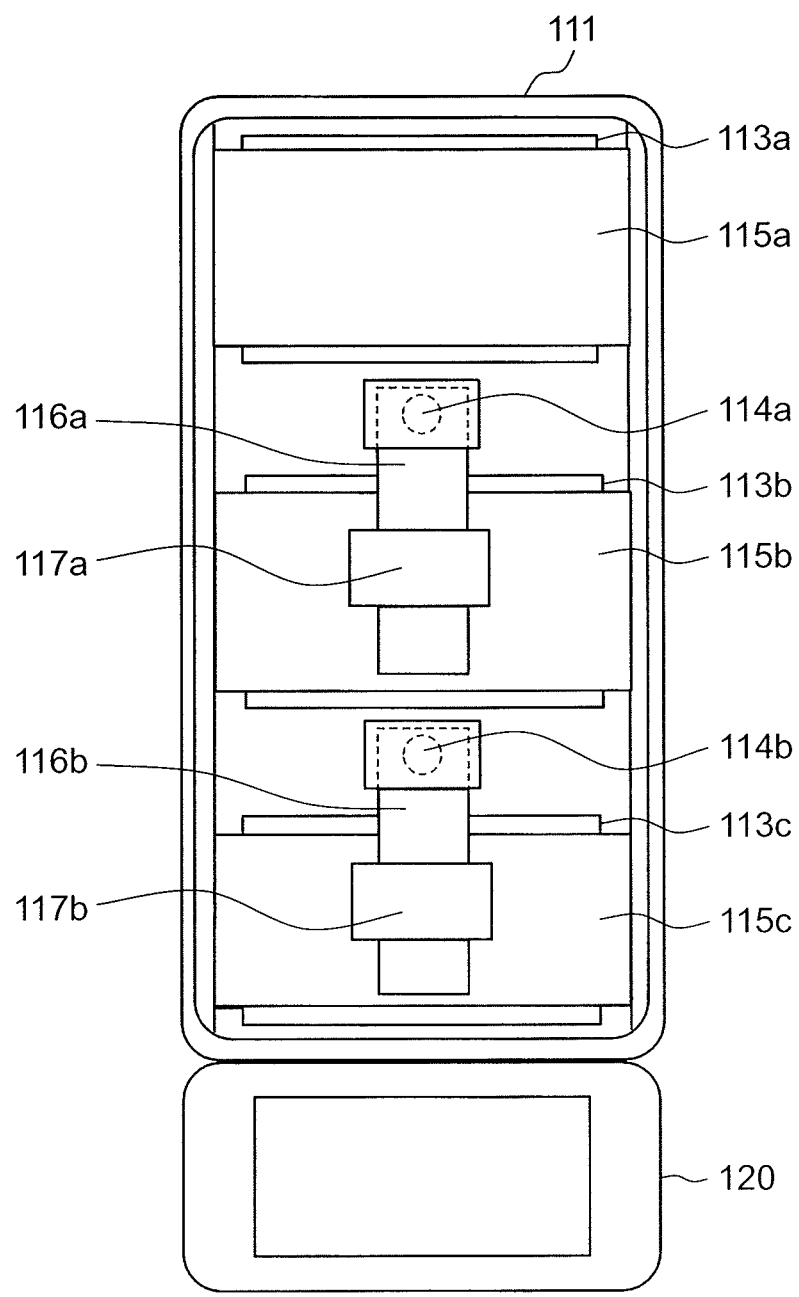
FIG. 3 is a rear view showing an internal configuration of the collation device.

FIG. 3 is a rear view showing an internal configuration of collation device 100. FIG. 3 is a view of the inside of housing 111 as seen from the back side with the rear plate of housing 111 removed.

Displays 113a, 113b, and 113c are respectively fixed to housing 111 by support members 115a, 115b, and 115c.

The light incident on camera lenses 114a and 114b enters camera main bodies 116a and 116b, respectively, and is imaged. Camera main bodies 116a and 116b are fixed by support members 117a and 117b, respectively.

Figure 4:
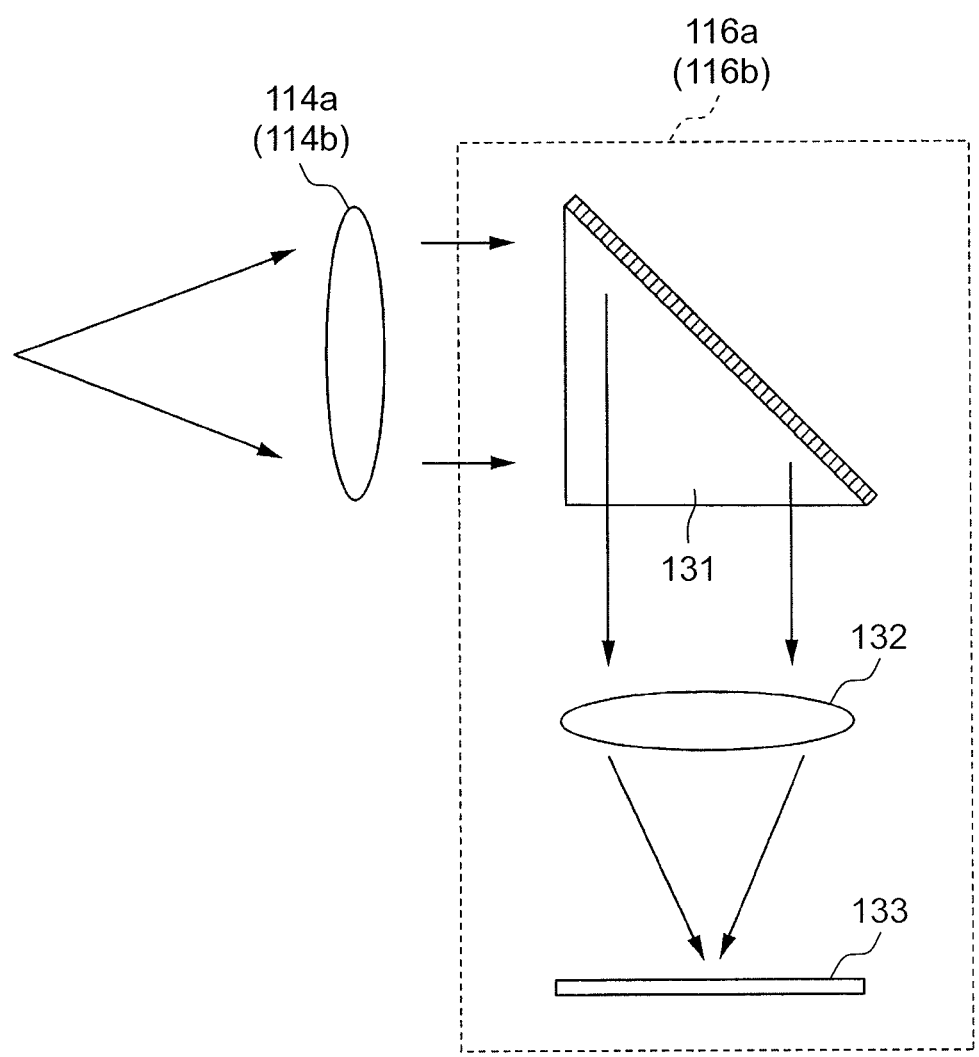
FIG. 4 is a schematic view showing a configuration of a camera according to the embodiment.

FIG. 4 is a schematic view showing a configuration of the camera according to the embodiment. The light passing through camera lens 114a (114b) disposed in gap D of the display is refracted in the vertical direction by prism 131 as a polarizing member. The refracted light is incident on charge coupled device (CCD) 133 as an imaging element by imaging lens 132, converted into an electric signal by CCD 133, and recorded as an image. As described above, the light obtained by camera lenses 114a and 114b is polarized so as to be refracted in the vertical direction by the polarizing member such as prism 131 and then imaged by the imaging device, thereby reducing the size of camera main bodies 116a and 116b in a horizontal direction by effectively utilizing the space on the back of displays 113b and 113c, and as a result, housing 111 of collation device 100 may be thinned.

Operation

Next, the operation of collation device 100 will be described.

When a human sensor (not shown) detects that the user stands in front of collation device 100, information indicating that a person is detected is output from the human sensor to collation device 100. Then, collation device 100 starts guidance by displays 113a, 113b, and 113c.

As the guidance, collation device 100 displays letters prompting the user to input a collation target image, such as "please put a passport" on lowest display 113c. When passport 122 is placed on glass surface 121, the face image printed on passport 122 by collation target image acquisition unit 120 or stored in an IC chip of passport 122 is read. Here, it is possible to guide the user's line of sight to the direction of collation target image acquisition unit 120 and to notify the user of the position of collation target image acquisition unit 120 by displaying the guidance on lowest display 113c closest to collation target image acquisition unit 120.

Next, collation device 100 displays letters calling attention for shifting the user's line of sight in a predetermined direction, such as "please turn to the front" on lowest display 113c. If the indication of the letters calling attention for shifting the user's line of sight in the predetermined direction are erased after a certain period of time has elapsed since the letters are displayed, it is easy to guide the user's line of sight to the front.

In this embodiment, letters such as "please face the front" is displayed on lowest display 113c, but a display that makes such indication is not limited to display 113c. An indication such as "please turn to the front" may be displayed on all displays 113. However, at least, there is an advantage that the user may easily notice the indication in the case of displaying the indication on the display on which the indication prompting the user to input the collation target image has been displayed. This is because the movement of the user's point of view is reduced, as the display 113c is a display on which the indication of letters "please put a passport" has been displayed, and, the indication such as "please turn to the front" is displayed on the display 113c successively.

Next, collation device 100 displays information to be notified to the user at the time of imaging, such as an indication that imaging is to be performed, cautions for imaging, and the like on displays 113a, 113b, and 113c. Collation device 100 performs imaging using camera lenses 114a and 114b after or as displaying information to be notified to the user at the time of imaging.

Here, among displays 113a, 113b, and 113c, the information to be notified to the user at the time of imaging may be displayed on all displays or may be displayed on a specific display.

In the case of displaying information on a specific display, a display for displaying information may be selected based on the images obtained by camera lenses 114a and 114b. That is, if one or both of the displays adjacent to the lens that is capturing an image in which the person's line of sight faces the front better is selected as a specific display from among the images obtained by camera lenses 114a and 114b, it is possible to reduce the movement of the user's line of sight. In addition, the place of the information to be displayed on the selected display may be determined based on the images obtained by camera lenses 114a and 114b. For example, it is possible to display information on the display in a place facing the user by detecting the angle or line of sight of the face orientation in the image.

In addition, in the case of displaying information on a specific display, a display for displaying information may be selected based on a parameter for estimating the position of the user's face, such as the height of the user. That is, it is possible to reduce the movement of the user's line of sight by selecting a display closer to the position of the user's face as a specific display. In addition, the place of the information displayed on the selected display may be determined based on a parameter for estimating the position of the face of the user such as the height of the user. For example, it is possible to display the information at the place corresponding to the height of the user by preliminarily preparing a database in which the height of the users is associated with the place of each display.

In addition, even if the specific display is middle display 113b among all the displays, it is possible to reduce the movement of the user's line of sight.

In the image, one of the following algorithms may be applied to determine the angle of the face orientation in the image or the degree to which the line of sight faces the front. For example, inputting an image to an identifier (identification algorithm) learning a face image of a plurality of angles including a front face may be applied. In addition, estimating that the image with a higher score when the image and the collation target image are compared is an image that faces the front more may be applied.

In addition, the parameter for estimating the position of the face of the user, such as the height of the user, may be obtained by using a distance sensor or the like disposed facing in the vertical direction. In addition, in a case where a plurality of such distance sensors are disposed, even in a case where the user is shifted to the left and right with respect to the display, it is possible to detect the amount of the shift. At which place of the selected display the information is to be displayed may be determined based on the amount of the shift.

In addition, the selection of whether to use the image of the camera lens 114a or the image of the camera lens 114b as an image to be used for collation may also be made by selecting the image of the person whose line of sight faces the front more. In addition, a similar selection may be made by selecting an image obtained by a lens estimated to be closer to the position of the face based on a parameter for estimating the position of the face such as the height of the user.

In the configuration according to the present embodiment, both the display and the camera lens may be disposed substantially at the front position of the user. Therefore, even when the user visually recognizes the information on the display, it is possible to capture a face image in which the line of sight faces substantially toward the front of the lens. In other words, since the position facing the line of sight and the position to capture an image are almost the same, it is possible for the user to capture an image with little need to move the line of sight. As a result, it is possible to capture, by the camera, a face image suitable for collation, while displays 113a, 113b, and 113c display an easy-to-see indication suitable for collation to the user.

In addition, as in the present embodiment, when half mirror 112 is disposed at a position covering the display and the lens, the user views the information on the display and confirms his or her facial expression displayed on half mirror 112 or tries to align his or her eyes with the his or her own image reflected by half mirror 112. In the present embodiment, as described above, even in a state where the user focuses on half mirror 112, it is possible to capture almost the same face as the face reflected on half mirror 112 with the camera, because both display 113 and camera lens 114 are disposed substantially at the front position of the user in the back side of half mirror 112. In addition, it is possible to reduce the movement between the line of sight for visually recognizing the information displayed on display 113 and the line of sight visually recognizing himself or herself reflected by half mirror 112. In this embodiment, various information is displayed on display 113 existing in the back side of half mirror 112. When such information is displayed, it is desirable to display the area other than the area where information is displayed on display 113 with low luminance or in black. In this way, the light from the user side is reflected to a place where no information is displayed, and therefore only the displayed information is displayed as if the information pops up. Therefore, attention to user's information may attract more attention to information.

In this way, when obtaining the face image of the passport (collation target image) and the face image of the actual user, collation device 100 collates these face images by an image processing unit (not shown).

Then, gate 11 is opened and closed based on the result of collation.

As described above, according to the present embodiment, since it is possible to make the line of sight for viewing the display and the line of sight for imaging by the cameras be almost the same line of sight by disposing the plurality of displays 113a, 113b, and 113c with predetermined gap D and disposing camera lenses 114a and 114b in this gap D, it is possible to realize collation device 100 capable of imaging a face image suitable for collation by the cameras while making a display suitable for collation by displays 113a, 113b, and 113c to the user.

In other words, it may be said that the configuration of this embodiment is that the display is divided into a plurality of displays and the cameras are disposed therebetween. By doing like this, it is possible to dispose the camera without occupying the front position of the face only with the display.

Various embodiments have been described with reference to the drawings, but it goes without saying that the present disclosure is not limited to such an example. Within the category described in the claims, it will be apparent to those skilled in the art that various changed examples or modification examples may be conceived, and it should be understood that such modifications naturally belong to the technical scope of the present disclosure. In addition, each constituent element in the above embodiment may be arbitrarily combined without departing from the gist of the disclosure.

Figure 5:
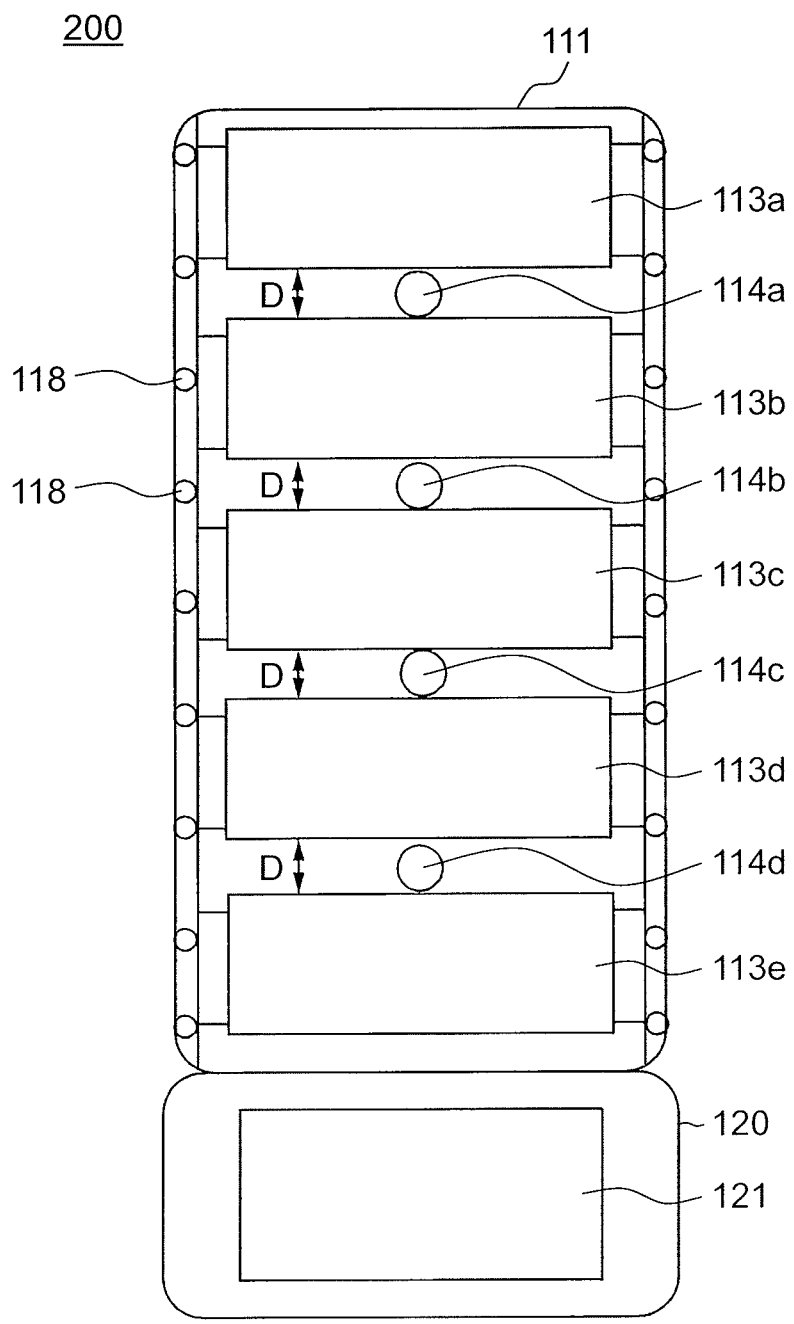
FIG. 5 is a front view showing an internal configuration of a collation device according to another embodiment.

In the above-described embodiment, the case where three displays 113a, 113b, and 113c, and two camera lenses 114a and 114b are disposed in the back side of half mirror 112 has been described, but the number of displays and cameras is not limited thereto, the point is that a plurality of displays are disposed in the back side of the half mirror and the camera lens is disposed in gap D of the displays. In collation device 200 in FIG. 5 in which the same reference numerals are given to the corresponding parts in FIG. 2, five displays 113a to 113e are disposed with gap D, and four camera lenses 114a to 114d are disposed in gaps. D therebetween as an example.

In addition, in the above-described embodiment, the case in which the plurality of displays 113a, 113b, and 113c are disposed in the vertical direction has been described, but the direction in which the plurality of displays are disposed is not limited to the vertical direction. For example, a plurality of displays may be disposed with gap D in the horizontal direction, and the camera lens may be disposed in gaps D therebetween.

Summary

The collation device of the present disclosure is a collation device including a plurality of displays and an imaging device, in which the displays are disposed with predetermined gap D inside a housing of the collation device and the lens of the imaging device is disposed in gaps D between the displays. By doing like this, it is possible to dispose the camera without occupying the front position of the face only with the display.

In addition, in the collation device of the present disclosure, a half mirror is disposed at a position covering the plurality of displays and lenses of the imaging device. By doing like this, even if the user focuses on the half mirror, it is possible to image almost the same face as the face reflected on the half mirror with the camera. In addition, it is possible to reduce the movement between the line of sight for visually recognizing the information displayed on the display and the line of sight visually recognizing himself or herself reflected by the half mirror.

In addition, in the collation device of the present disclosure, the plurality of imaging devices are disposed, three or more displays are disposed in the vertical direction, and the lenses of the imaging devices are disposed at different heights in the vertical direction in gaps D between the displays. By doing like this, since the plurality of imaging devices are disposed, there is a high possibility that the imaging devices exist in front of the user when the user aligns his or her line of sight to the half mirror according to the guidance of the display. Therefore, irrespective of the height of the user, it is easier to capture a face image in which the line of sight faces the front.

In addition, the collation device of the present disclosure further includes a polarizing member that polarizes the light beam obtained by the lens, in which the light beam polarized by the polarizing member is incident on the imaging element of the imaging device existing in the back side of the display. By doing like this, it is possible to make housing 111 of collation devices 100 and 200 thin.

In addition, the collation device of the present disclosure further includes an image acquisition unit that acquires a collation target image and displays that the image is to be read by the image acquisition unit on a display closest to the image acquisition unit among the plurality of displays. By doing like this, it is possible for the user to notice the position of collation target image acquisition unit 120.

INDUSTRIAL APPLICABILITY

The present disclosure is suitable for a collation device in which a display and a camera are disposed in the back side of a half mirror.

REFERENCE MARKS IN THE DRAWINGS

100, 200 COLLATION DEVICE
110 MAIN UNIT
111 HOUSING
112 HALF MIRROR
113*a*, 113*b*, 113*c*, 113*d*, 113*e* DISPLAY
114*a*, 114*b*, 114*c*, 114*d* CAMERA LENS
115*a*, 115*b*, 115*c*, 117*a*, 117*b* SUPPORT MEMBER
116*a*, 116*b* CAMERA BODY
118 LED LAMP
120 COLLATION TARGET IMAGE ACQUISITION UNIT
121 GLASS SURFACE

The invention claimed is:

1. A collation device comprising:
a plurality of displays that are disposed at different heights in a vertical direction with a gap inside a housing of the collation device;
an imaging device that captures a face image of a user; and
a half mirror that covers the plurality of displays, wherein:
one of the plurality of displays is controlled to display information relating to a collation of the face image, and is selected according to a height of the user, and
another one of the plurality of displays is controlled to display with low luminance or in black.

2. The collation device of claim 1,
wherein the half mirror further covers the lens of the imaging device.

3. The collation device of claim 1,
wherein a plurality of lenses of the imaging device are disposed, at different heights in the vertical direction, and
at least one of the plurality of lenses is disposed in the gap between the plurality of displays.

4. The collation device of claim 1, further comprising:
a polarizing member for polarizing a light beam obtained by the lens,
wherein the light beam polarized by the polarizing member is incident on an imaging element of the imaging device in a back side of the display.

5. The collation device of claim 1,
wherein a plurality of the imaging devices are disposed, three or more displays are disposed in a vertical direction, and
lenses of the imaging devices are disposed at different heights in the vertical direction in the gaps between the displays.

6. The collation device of claim 1, wherein,
the information relating to a collation of the face image is an image to prompt the user to direct a line of sight to a predetermined direction.

7. The collation device of claim 6, wherein,
a face image recorded in a passport and the face image captured by the imaging device are collated, and
the one of the plurality of displays is controlled to display an image to prompt the user to input a face image recorded in a passport.

8. The collation device of claim 6, wherein,
the collation device erases the image to prompt the user to direct a line of sight to a predetermined direction after a predetermined period of time has elapsed.

9. The collation device of claim 1, wherein,
the information relating to a collation of the face image is information necessary to inform the user of the capturing of the face image by the imaging device.

10. The collation device of claim 1, wherein the half mirror is a single half mirror that covers the plurality of displays.

11. The collation device of claim 1, wherein light from the half mirror is reflected in an area of the another one of the plurality of displays.

12. The collation device of claim 1, wherein only the information displayed by the one of the plurality of displays is displayed through the half mirror.

13. A collation device comprising:
a plurality of displays that are disposed at different heights in a vertical direction with a gap inside a housing of the collation device;
an image acquisition unit that acquires a collation target image;
an imaging device that captures a face image of a user; and
a half mirror that covers the plurality of displays, wherein:
one of the plurality of displays is controlled to display information relating to a collation of the face image,
another one of the plurality of displays is controlled to display with low luminance or in black, and
the device displays that the image is to be read by the image acquisition unit on a display closest to the image acquisition unit among the plurality of displays.

14. A collation device comprising:
a plurality of displays that are disposed at different heights in a vertical direction with a gap inside a housing of the collation device;
an image acquisition unit that acquires a collation target image;
an imaging device that captures a face image of a user; and
a half mirror that covers the plurality of displays, wherein:
one of the plurality of displays is controlled to display information relating to a collation of the face image,
another one of the plurality of displays is controlled to display with low luminance or in black,
a face image recorded in a passport and the face image captured by the imaging device are collated,
the information relating to a collation of the face image is an image to prompt the user to input a face image recorded in a passport via the image acquisition unit, and
a display of the plurality of displays closest to the image acquisition unit among the plurality of displays is selected as the one of the plurality of displays on which the information relating to a collation of the face image is to be displayed.

15. The collation device of claim 12, wherein,
the image acquisition unit is disposed at lower position than the plurality of displays in a vertical direction, and,
the display lowest among the plurality of displays in the vertical direction is selected as the one of the plurality of displays on which the information relating to a collation of the face image is to be displayed.

* * * * *